(12) United States Patent
Böckem et al.

(10) Patent No.: US 9,366,531 B2
(45) Date of Patent: *Jun. 14, 2016

(54) COORDINATE MEASURING DEVICE

(71) Applicant: LEICA GEOSYSTEMS AG, Heerbrugg (CH)

(72) Inventors: Burkhard Böckem, Rieden AG (CH); Simon Fuchs, Suhr (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 10 days.

This patent is subject to a terminal disclaimer.

(21) Appl. No.: 14/296,293

(22) Filed: Jun. 4, 2014

(65) Prior Publication Data

US 2014/0285792 A1 Sep. 25, 2014

Related U.S. Application Data

(63) Continuation of application No. 13/377,739, filed as application No. PCT/CH2010/000153 on Jun. 14, 2010, now Pat. No. 8,772,719.

(30) Foreign Application Priority Data

Jun. 23, 2009 (CH) ........................................ 972/09

(51) Int. Cl.
*G01J 5/00* (2006.01)
*G01C 3/08* (2006.01)
(Continued)

(52) U.S. Cl.
CPC ................. *G01C 3/08* (2013.01); *G01C 15/002* (2013.01); *G01S 17/023* (2013.01); *G01S 17/66* (2013.01); *G01S 17/87* (2013.01)

(58) Field of Classification Search
CPC .... G01B 11/002; G01B 11/026; G01B 11/03; G01C 3/08; G01S 5/163; G01S 17/66
See application file for complete search history.

(56) References Cited

U.S. PATENT DOCUMENTS 6,137,569 A 10/2000 Sasaki et al.
6,411,371 B1 6/2002 Hinderling et al.
(Continued)

FOREIGN PATENT DOCUMENTS

EP 2 071 283 A1 6/2009
JP 2000-180168 A 6/2000
(Continued)

OTHER PUBLICATIONS

Sahler, FARO Adds Vision to Laser Tracker with new TargetCAM, pp. 1-2, Nov. 2, 2005, FARO Technologies, Inc., Lake Mary, FL.†

*Primary Examiner* — Kiho Kim
(74) *Attorney, Agent, or Firm* — Maschoff Brennan

(57) ABSTRACT

A coordinate measuring device includes a carrier that automatically rotates about two axes and can be directed toward a measuring aid. The following are arranged on the carrier so as to be able to move together: a device for optically measuring the distance to the measuring aid; a first light source for emitting a target beam that is visible as a first target point when reflected on the measuring aid; a detection unit for determining a fine position of the first target point on a first position detection sensor; a second light source, the light of which is visible as a second target point when reflected on the measuring aid; a rough target detection unit for determining a rough position of the second target point on a second position detection sensor. A control device directs the carrier toward the measuring aid according to the fine and rough positions.

21 Claims, 2 Drawing Sheets

(51) Int. Cl.
*G01C 15/00* (2006.01)
*G01S 17/02* (2006.01)
*G01S 17/66* (2006.01)
*G01S 17/87* (2006.01)

(56) References Cited

U.S. PATENT DOCUMENTS

| | | | |
|---|---|---|---|
| 6,445,446 | B1 | 9/2002 | Kumagai et al. |
| 6,504,602 | B1 | 1/2003 | Hinderling |
| 6,734,952 | B2 | 5/2004 | Benz et al. |
| 7,800,758 | B1 * | 9/2010 | Bridges ............... G01B 11/002 356/482 |
| 8,279,430 | B2 | 10/2012 | Dold et al. |
| 2010/0253931 | A1 | 10/2010 | Meier et al. |
| 2013/0063715 | A1 | 3/2013 | Boeckem et al. |

FOREIGN PATENT DOCUMENTS

| | | |
|---|---|---|
| JP | 2003-214851 A | 7/2003 |
| JP | 2004-170356 A1 | 6/2004 |
| JP | 2009-523236 A | 6/2009 |
| WO | 2007/079600 A1 | 7/2007 |

\* cited by examiner
† cited by third party

COORDINATE MEASURING DEVICE

RELATED APPLICATIONS

This application is a continuation of U.S. patent application Ser. No. 13/377,739 which is the national stage of PCT/CH2010/000153 filed Jun. 14, 2010. The foregoing applications are incorporated herein by reference.

FIELD

The invention relates to a coordinate measurement apparatus and to a method for operating a coordinate measurement apparatus, according to the preamble of the respective independent patent claims.

STATE OF THE ART

Coordinate measurement apparatus, often called laser trackers, are applied for the measurement of the position moving target points. The term laser trackers is to be understood as devices which comprise at least one distance meter operating with a focused laser beam (indicated as measurement beam in the following description). For example, the direction of the measurement beam is set to the target point with the help of a mirror rotatable about two axes, and is detected with angle sensors assigned to the rotation axes. The target point to be measured is provided with a retroreflector (in particular cube-corner prism or arrangement of three mirrors which are perpendicular to one another), wherein the retroreflector reflects the measurement beam of the laser tracker which is incident thereon, back to this laser tracker. Thereby, the reflected measurement beam runs coaxially to the emitted measurement beam if the measurement beam is incident on the reflector in an exactly centric manner, and offset parallel thereto, if the measurement beam is not centrically incident on the reflector. One concludes an absolute distance between the laser tracker and the target point and/or a change of this distance from a comparison of the emitted and reflected laser light, depending on the embodiment of the tracker (absolute distance meter or interferometer). The position of the reflector or of the target point relative to the tracker is computed from the angles detected by the angle sensors and from the distance detected by the distance meter.

A part of the reflected measurement beam is usually guided onto a PSD (position sensitive device). One may deduce the parallel shifting of the reflected measurement beam relative to the emitted measurement beam from the position, in which the reflected measurement beam is incident on the light-sensitive surface of the PSD. The measurement data which is determined by way of this defines the parallel offset of the reflected measurement beam and is used for a control of the measurement beam direction, in a manner such that the measurement beam follows the target point (tracking), when this moves. This means that by way of a suitable change of the measurement beam direction or of the alignment of the mirror aligning the measurement beam, one ensures that the parallel offset between the emitted and the reflected measurement beam is reduced or remains as small as possible.

Various arrangements of optical distance meters and picture detection sensors are described in WO 2007/079600 A1. In one arrangement (FIG. 4), an overview camera (104), a position-sensitive diode (109) operating in the visible spectral range and a zoom camera (106) are all coupled into the measurement light path of a distance measurement device (200, 300). The position-sensitive diode (109) must operate in the visible range, in order to be able to also use a precise measurement light beam of a He—Ne laser of an interferometer. A reflector illumination (110) is arranged outside the measurement light path and operates in the visible range in a manner matched to the overview camera, for detecting reflected targets. The overview camera must operate in the visible range, in order to be able to produce pictures of a good quality, in particular colour pictures.

U.S. Pat. No. 6,504,602 B1 describes a theolodite with a distance measurement apparatus. An automatic target recognition uses radiated light in the visible range or in the near infrared range.

EP 2 071 283 A2 describes the use of two separate cameras with wide and narrow viewing angles, in each case with their own light source coupled into the camera optical system. The cameras are arranged separately from one another, one of which with the viewing axis collinear to a distance meter, and operate with visible light. A target recognition is accomplished in each case by way of switching the respective light source on/off and a subsequent difference formation from the respective pictures.

SUMMARY OF THE INVENTION

Some embodiments provide for a coordinate measurement apparatus and a method for operating a coordinate measurement apparatus of the initially described type, which permit an inexpensive realisation and at the same time precise measurements.

Some embodiments include a coordinate measurement apparatus and a method for operating a coordinate measurement apparatus.

The coordinate measurement apparatus thus comprises a carrier which is rotatable about at least two axes with respect to a base, wherein the carrier, by way of rotation about these at least two axes, can be automatically aligned to a measurement aid movable in space, by way of a closed-loop control device. In each case, at least one exit optical system and/or entry optical system of the following units can be arranged on the carrier in a commonly movable manner:

at least one optical distance measurement device for measuring the distance (along a measurement path) to a measurement aid movable in space;

a first (e.g. infrared) light source and optical system (or optical elements) for radiating a first (e.g. infrared) target beam, wherein the target beam, with a reflection at the measurement aid, is visible as a first (e.g. infrared) target point, a fine target detection unit for determining a fine position as the position of the image of the first target point on a first position detection sensor, wherein the fine target detection unit and the distance measurement device have a common exit optical system;

a second light source which radiates light at least in the infrared range, wherein this light, with a reflection at the measurement aid, is visible as a second target point;

a coarse target detection unit for determining a coarse position as the position of the image of the second target point on a second position detection sensor, wherein the coarse target detection unit is only sensitive to light in the infrared range.

Thereby, the closed-loop control device is set up for aligning the carrier onto the measurement aid by way of rotation about the at least two axes of the carrier in accordance with the fine position and the coarse position.

This closed-loop control can alternatively take into account the fine position and the coarse position, for example by way of switching to the fine position on account of the coarse position by the closed-loop control when approaching the target point. However, a closed-loop control can also be present, which simultaneously firstly processes both values and thereby only selects one of the two values and uses it for the closed-loop control.

A compact unit is created by way of the arrangement of the exit optical system and/or entry optical system of all units, and this unit can realise a multitude of functions and at the same time has a simple mechanical construction (only two driven axes). All units are aligned with one another onto the measurement aid or target. Measurement aids which have not yet been detected, can be detected in a large region, approached and tracked with the two target detection units.

Preferably, the optical axis of the fine target detection unit outside the coordinate measurement apparatus runs coaxially to the optical axis of the distance measurement device on a common measurement axis. This assumes that the fine target detection unit and the distance measurement device have a common exit optical system. Common exit optical system (or entry optical system) of two beam paths means that the two beam paths exit through the same optical element such as a lens or glass pane, out of the apparatus into the surroundings, or enter from the surroundings of the apparatus into the apparatus. Thereby, as a rule, the beam paths are at least approximately coaxial.

In another preferred embodiment of the invention, the optical axes of the fine target detection unit and of the coarse target detection unit do not run coaxially outside the carrier. Thus the optical axes then run either through the same exit optical system, but not coaxially, or they run through separate exit optical systems.

Typically, the fine target detection unit has an opening angle or viewing angle of less than 1° or less than 2° or less than 3°. Preferably, the coarse target detection unit has a viewing angle of more that 3° or more than 10° or more than 15° and preferably up to about 30° (i.e. ±15°).

In a preferred embodiment of the invention, the fine target detection unit and the coarse target detection unit are sensitive in regions of the light (particularly infrared) spectrum which are separate from one another (thus in each case either the corresponding sensor or the combination of the sensor with a filter). Thereby, the fine target detection unit is sensitive to the light of the first light source, and the coarse target detection unit is sensitive to the light of the second light source. Thus the fine target detection unit does not perceive the light of the second light source, and the coarse target detection unit does not perceive the light of the infrared light source.

Preferably, all optical and electrical elements of the different units are located on the carrier. However, it is also possible for individual elements or several units to be located on a base or in an intermediate unit, and to be connected to the carrier with fibre-optic leads. Such elements for example are laser sources or beam splitters and detectors.

Preferably, in a further embodiment of the invention, an overview camera which is sensitive at least in the visible region of the spectrum is present for the coarse localisation of the measurement aid by way of light in the visible region. This preferably has a larger viewing angle than the coarse target detection unit. With this, it is possible to realise a three-stage method for localising and tracking the measurement aid, by way of the measurement aid first being searched by the overview camera, the carrier then being aligned onto the measurement aid, and then the measurement aid being approached with the coarse target detection unit and subsequently with the fine target detection unit.

With the method for operating the coordinate measurement apparatus, the carrier is aligned onto the measurement aid by way of rotation about the at least two axes of the carrier in accordance with the fine position, the coarse position and optionally also the readings of the overview camera.

In another aspect of the invention, which can be realised independently of, or in combination with the previously described elements, the coordinate measurement apparatus comprises a carrier which is rotatable about at least two axes with respect to a base, wherein the carrier, by way of rotation about these at least two axes, can be automatically aligned onto a measurement aid movable in space, by way of a closed-loop control device. At least in each case one exit optical system and/or entry optical system of the following units are arranged on the carrier in a commonly movable manner:

at least one optical distance measurement device for measuring the distance (along a measurement path) to a measurement aid moved in space;

a first (e.g. infrared) light source and optical system for radiating a first (e.g. infrared) target beam, wherein the target beam, with a reflection at the measurement aid, is visible as a first (e.g. infrared) target point;

a fine target detection unit for determining a fine position as the position of the image of the first target point on a first position detection sensor, wherein the fine target detection unit and the distance measurement device have common a exit optical system.

Thereby, one optical axis of the fine target detection unit runs outside the coordinate measurement apparatus coaxially to the optical axis of the distance measurement device on a common measurement axis, and the carrier is rotatable about a tilt axis which runs at least approximately horizontally on operation of the coordinate measurement apparatus, and about a pivot axis which runs at least approximately vertically. Thereby, the measurement axis does not intersect the tilt axis and/or the measurement axis does not intersect the pivot axis.

A simpler manufacture of the beam splitter for separating the beam path from the distance measurement device and fine target detection unit is possible by way of this: According to the state of the art, the beam splitters along the measurement axis are designed in a manner such that the beam path of the non-deflected light component in the measurement beam runs straight ahead, thus without offset with respect to the measurement axis. This is usually due to the fact that a) on the one hand, the measurement axis should intersect the pivot axis and the tilt axis, in order to keep the geometry of the measurement and thus the computation of the position of the measurement aid as simple and as exact as possible, b) on the other hand, on account of reasons due to manufacturing technology, in a highly precise apparatus, the beam path should run in the inside of the apparatus exactly in the centre of a tubular insert.

In accordance with this aspect of the invention, one makes do without adhering to the condition a). The computations turn out to be more complex due to this, however, a semitransparent plate can be used instead of a prism. With this, a separation of the beam paths from the distance measurement device and the fine target detection unit becomes possible, which is improved with regard to weight and costs.

In another aspect of the invention which can be realised independently of, or in combination with the previously described elements, the distance measurement device comprises a measurement light source for producing a measurement light beam, as well as a beam splitter which couples out a part of the produced measurement light beam, and a beam expander which expands the coupled-out measurement light and by way of this leads it onto separate detectors.

By way of this, it is possible to lead the light of the measurement light source onto two independent detectors without a (more complicated) beam splitter, of which detectors the one is used for the closed-loop control of the intensity of the measurement light source, and the other for safety reasons, in order to trigger an emergency switch-off when an exit intensity of the measurement light source is too high. The redundancy corresponding to this dual design of the sensors is necessary for safety reasons.

BRIEF DESCRIPTION OF THE DRAWINGS

The subject matter of the invention is hereinafter explained in more detail by way of preferred embodiment examples which are represented in the accompanying drawings. In each case are shown schematically in.

The reference numerals used in the drawings and there significance are listed in a grouped manner in the list of reference numerals. Basically, the same parts are provided with the same reference numerals in the figures.

DETAILED DESCRIPTION

Figure 1:
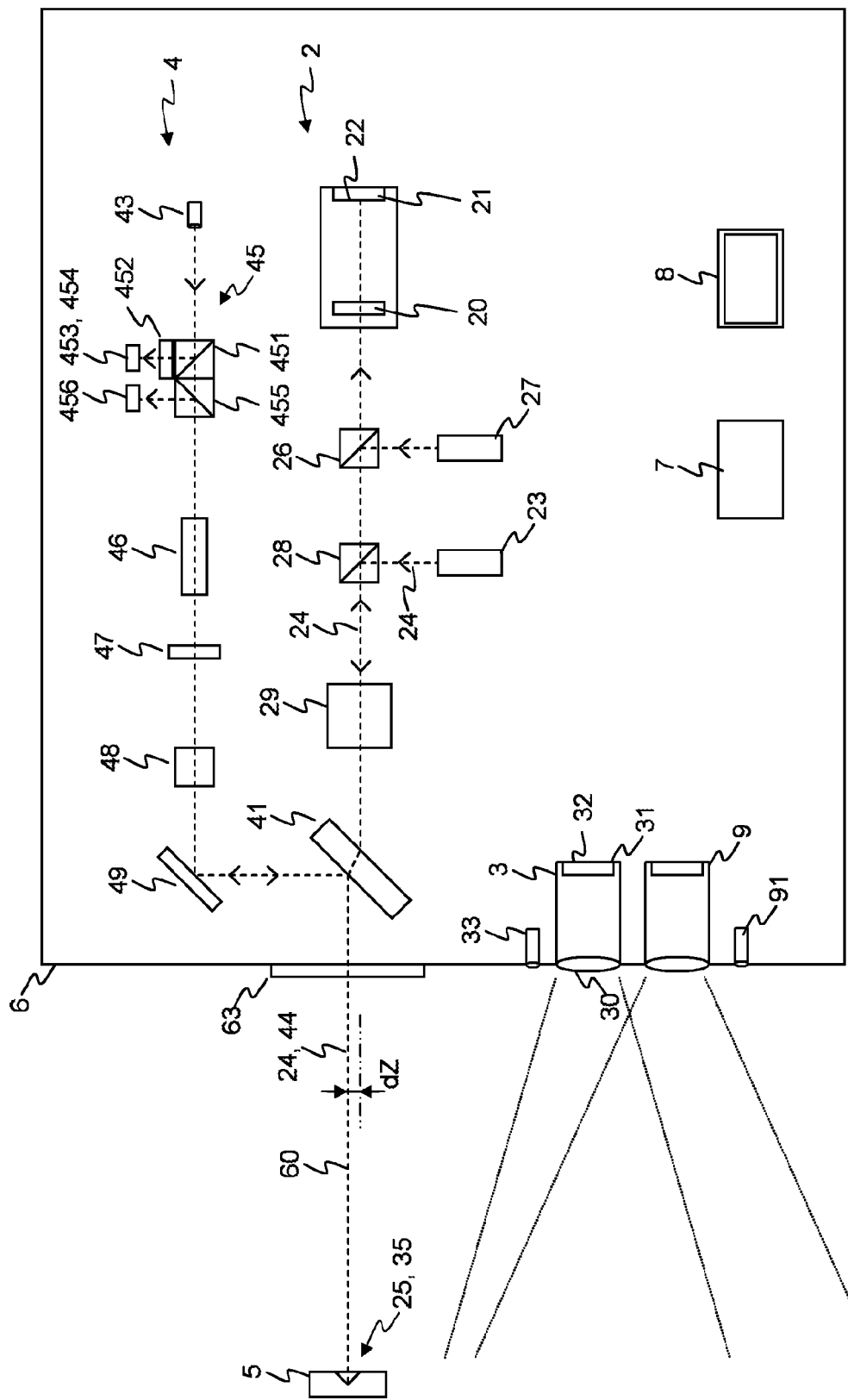
FIG. 1 essential components and the beam path in a coordinate measurement apparatus according to the invention.

FIG. 1 schematically shows the beam path in a coordinate measurement apparatus 1 in a preferred embodiment of the invention. The essential elements of the coordinate measurement apparatus 1 are arranged in or on a carrier 6, preferably in a common housing. A fine target detection unit 2 produces an infrared target beam 24, and a distance measurement device 4 produces a measurement light beam 44. The two beams exit through a common exit optical system 63 and run preferably coaxially along a measurement axis 60. A coarse target detection unit 3 with a second light source 33, and an overview camera 9 are yet arranged on the carrier. A regulation (closed-loop control) and control 7 detects and process the readings of different sensors and controls axial position motors for aligning the carrier 6. A display device 8 shows information on the measurements and the apparatus condition and can also display pictures from one of the present picture sensors, in particular of the overview camera 9.

In a measurement mode or tracking mode, the coordinate measurement apparatus 1 or the carrier 6 is aligned onto a measurement aid 5, for example a retroreflector such as a triple mirror or a cube-corner prism. The two beams are reflected thereon and are visible to the coordinate measurement apparatus 1 as an infrared target point or to the distance measurement device 4 as a second target point 35. The second target point 35, geometrically and seen from the measurement apparatus 1, is visible at least approximately or also exactly at the same location in space as the first target point 25. Conceptionally and with regard to the wavelength region however, both points 25, 35 are however considered as being different to one another.

Figure 2:
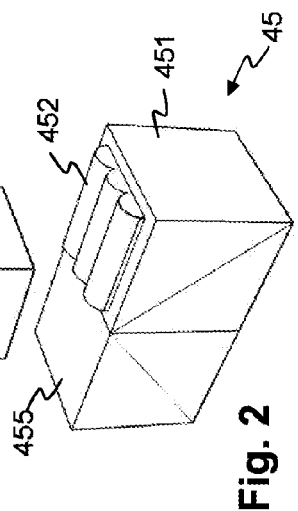
FIG. 2 a sensor arrangement with a beam splitter.

The distance measurement device 4 in the shown example is an absolute distance measurement apparatus, but can also be an interferometer, or a combination of both. Therein, a measurement light source 43 radiates the measurement light beam 44. This runs through a first beam splitter 451 for splitting the radiated light, and a second beam splitter 455 for deflecting the returning light. The two beam splitters 451, 455 are part of a sensor unit 45. The deflected part of the radiated light is expanded by way of a beam expansion 452 and is led onto two intensity sensors 453, 454. The one of these intensity sensors 453 is used in the known manner for the closed-loop amplitude control of the measurement light source 43, the other 454 as an additional safely element for detecting an unallowably high intensity. The beam expansion 452 preferably comprises a cylinder prism or a row of cylinder prisms which lie next to one another and are formed for example as one piece. A perspective view of the main elements of the sensor unit 45 is represented in FIG. 2.

The returning light which is deflected by the second beam splitter 455 is led onto a detector 456. The intensity which is detected there is used in a manner known per se for determining the absolute distance, for example according to the Fizeau principle. For this, departing and returning measurement light 44 runs through an electrooptical modulator 46, a quarter-wave plate 47, a beam expansion 48, a deflection mirror 49 and a beam splitter 41 which combines the measurement light beam 44 with the infrared target beam 24 of the fine target detection unit 2 or separates these again on the return path.

The fine target detection unit 2 comprises an infrared source 23 which produces the infrared target beam 24. This is coupled in via a second in-coupling 28, and reaches the measurement axis 60 via an optional further beam expansion 29 and the beam splitter 41. The infrared light radiated by the infrared light source 23, by way of this, is coupled as a target beam 24 into the common beam path of the distance measurement device 4 and of the fine target detection unit 2. In the second in-coupling 28, the returning light is coupled out again according to the infrared target point 25 and via a first in-coupling 26 and a first band-pass filter 20 reaches the first position detection sensor 21. There, the fine position 22 of the image of the infrared target point 25 is produced on the first position detection sensor 21.

In the first in-coupling 26, optionally light from a pointer light source 27 is yet coupled in, and as a beam gets into the common beam path of the distance measurement device 4 and of the fine target detection unit 2. This light of the pointer light source 27 is in the visible region, so that the measurement axis 60 is also visible to the user on hitting an object. Thereby, wavelengths of approx. 380-750 nm are considered as the visible region. The transition to the IR region lies between 700 nm and 800 nm.

The coarse target detection unit 3 comprises a second position detection sensor 31. Light from the second light source 33, which can have a single or several light sources, is radiated with a relatively large emission angle. The emission angle is somewhat larger than the visible angle region of the coarse target detection unit 3, which is more than 3° or more than 10° or more than 15° or up to about 30° (i.e. ±15°). By way of this, the measurement aid 5 is also visible to the coarse target detection unit 3 if it is not detected in the fine target detection unit 2. The reflection of the light of the second light source 33 is visible and measurable as a coarse position 32 on a second position detection sensor 31 of the coarse target detection unit 3. By way of this measurement, the carrier 6 is aligned onto the measurement aid 5 until the fine target detection unit 2 detects its own infrared target beam 24. Subsequently, the fine position 22 is used, in order to track the measurement aid 5.

If the measurement aid 5, for example with a triple mirror, exactly reflects back the received light, the second light source 33 must be arranged close to the entry optical system of the coarse target detection unit 3.

In order to avoid mutual disturbances of the fine target detection unit 2 and of the coarse target detection unit 3, these preferably operate in different wavelength regions of the infrared spectrum. For example, the fine target detection unit 2 thereby has a first band-pass filter 20 with a first transmission range, and the coarse target detection unit 3 a second band-pass filter 30 with a second transmission range, wherein the two transmission ranges do not overlap. For example, the two wavelength regions 890-920 nm are for the fine target detection unit 2 and 835-865 nm for the coarse target detection unit 3. Moreover, the first band-pass filter 20 filters out measurement light of the distance measurement device 4 (from the measurement light source 43) which goes through the beam splitter 41 to the fine target detection unit 2 and may upset this.

The second light source 33, apart from the light in the IR region, may yet also radiate light in the visible region and by way of this also serve as an illumination for the overview camera 9. The overview camera 9 may also have its own illumination 91 for radiating light at least in the visible region.

Figure 3:
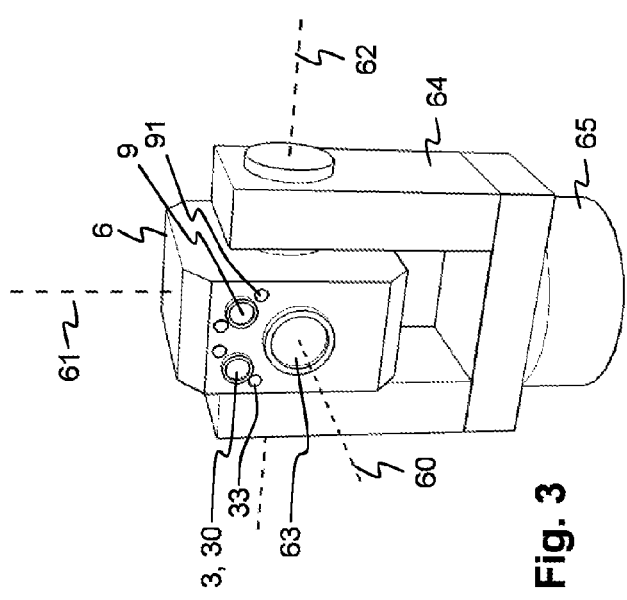
FIG. 3 an outer construction of a coordinate measurement apparatus.

FIG. 3 schematically shows the outer construction of a coordinate measurement apparatus 1 with the already described elements of the exit optical system 63, coarse target detection unit 3, here with two second light sources 33 on two sides of the entry optical system of the coarse target detection unit 30, as well as the overview camera 9 with its illumination 91, here likewise with two individual light sources at two sides of the entry optical system of the overview camera 9. Moreover are shown: the measurement axis 60, a tilt axis 62 about which the carrier 6 may be inclined with respect an intermediate carrier 64, and a pivot axis 61 about which the intermediate carrier 64 may be rotated with respect to a base 65.

Figure 4:
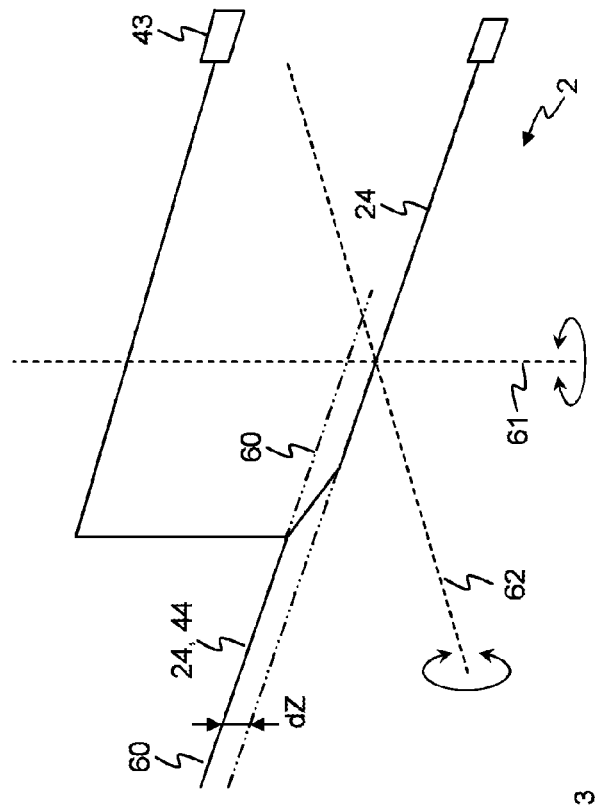
FIG. 4 an offset between the measurement axis and a mechanical collimation axis.

FIG. 4 schematically shows an offset dZ between the infrared target beam 24 within and outside the carrier 6 or its housing. In the inside of the housing, the infrared target beam 24 for mechanical reasons preferably intersects a perpendicular pivot axis 61 (or vertical axis) as well as a horizontal tilt axis 62 (or inclination axis) of the carrier 6. The vertical axis 61 is perpendicular to the tilt axis 62, this in turn is perpendicular to a target axis and to the measurement axis 60. The target axis (or mechanical collimation axis) corresponds to the course of the infrared target beam 24 in the inside of the carrier (up to the beam splitter 41). The target axis, the pivot axis 61 and the tilt axis 62 intersect at a point. The measurement axis 60 here however only intersects the pivot axis 61 but not the tilt axis 62. In an embodiment of the invention which is not represented, the measurement axis 60 only intersects the tilt axis 62 but not the pivot axis 61. In a further embodiment of the invention which is not shown, the measurement axis 60 neither intersects the pivot axis 61 nor the tilt axis 62.

The measurement axis 60 and the tilt axis 62 (or the pivot axis 61), are thereby distanced to one another by a distance of at least one half or a complete millimeter, preferably between 1.4 mm and 2.5 mm. The shift of the infrared target beam 24 of the fine target detection unit 2 is effected by the beam splitter 41 which as a plate lies in the beam path of the infrared target beam 24 and acts as a mirror for the measurement light beam 44.

The invention claimed is:

1. A coordinate measurement apparatus, comprising:
a carrier which, with respect to a base, is rotatable about at least two axes, wherein the carrier by way of rotation about these at least two axes, by way of a closed-loop control device, is configured to be automatically aligned onto a measurement aid movable in space,
wherein:
at least in each case, one exit optical system and/or entry optical system of the following units are arranged on the carrier in a commonly movable manner:
at least one optical distance measurement device for measuring the distance to a measurement aid moved in space;
a first light source and optical elements for radiating a target beam, wherein the target beam, with a reflection on the measurement aid, is visible as a first target point;
a fine target detection unit for determining a fine position as the position of the image of the first target point on a first position detection sensor, wherein the fine target detection unit and the distance measurement device have common exit optical system;
a second light source which radiates light at least in the infrared region, wherein this light, with a reflection at the measurement aid, is visible as a second target point on a second position detection sensor of a coarse target detection unit; and
the coarse target detection unit for determining a coarse position as the position of the image of the second target point on the second position detection sensor, wherein the coarse target detection unit is only sensitive to light in the infrared region; and
the closed-loop control device is configured for aligning the carrier onto the measuring aid by way of rotation about the at least two axes of the carrier in accordance with the fine position and the coarse position, wherein the carrier is aligned onto the measurement aid on account of the coarse position until the fine target detection unit detects the target beam.

2. A coordinate measurement apparatus, comprising:
a carrier which, with respect to a base, is rotatable about at least two axes, wherein the carrier by way of rotation about these at least two axes, by way of a closed-loop control device, is configured to be automatically aligned onto a measurement aid movable in space,
wherein at least in each case, one exit optical system and/or entry optical system of the following units are arranged on the carrier in a commonly movable manner:
at least one optical distance measurement device for measuring the distance to a measurement aid moved in space;
a first light source and optical elements for radiating a target beam, wherein the target beam, with a reflection on the measurement aid, is visible as a first target point;
a fine target detection unit for determining a fine position as the position of the image of the first target point on a first position detection sensor, wherein the fine target detection unit and the distance measurement device have common exit optical system;
a second light source which radiates light at least in the infrared region, wherein this light, with a reflection at the measurement aid, is visible as a second target point on a second position detection sensor of a coarse target detection unit; and
the coarse target detection unit for determining a coarse position as the position of the image of the second target point on the second position detection sensor, wherein the coarse target detection unit is only sensitive to light in the infrared region;
wherein the closed-loop control device is configured for aligning the carrier onto the measuring aid by way of rotation about the at least two axes of the carrier in accordance with the fine position and the coarse position;

and wherein an overview camera is arranged on the carrier, the overview camera being sensitive at least in the visible range, such that pictures from the overview camera are displayable by a display device.

3. The coordinate measurement apparatus according to claim 1 or 2, wherein:
the light radiated by the first light source, as the target beam, is coupled into the common beam path of the distance measurement device and of the fine target detection unit.

4. The coordinate measurement apparatus according to claim 3, wherein:
an optical axis of the fine target detection unit runs outside the coordinate measurement apparatus coaxially to the optical axis of the distance measurement device on a common measurement axis.

5. The coordinate measurement apparatus according to claim 3, wherein:
the optical axes of the fine target detection unit and of the coarse target detection unit do not run coaxially outside the carrier.

6. The coordinate measurement apparatus according to claim 1 or 2, wherein:
the fine target detection unit has a viewing angle of less than 1° or less than 2° or less than 3°.

7. The coordinate measurement apparatus according to claim 1 or 2, wherein:
the coarse target detection unit has a viewing angle of more than 3° or more than 10° or more than 15°.

8. A coordinate measurement apparatus according to claim 1 or 2, wherein:
the fine target detection unit and the coarse target detection unit are sensitive in regions of the light spectrum which are different from one another, and the fine target detection unit is sensitive to light of the first light source and the coarse target detection unit to light of the second light source.

9. The coordinate measurement apparatus according to claim 8, wherein:
the fine target detection unit comprises a first band-pass filter with a first transmission range, the coarse target detection unit a second band-pass filter with a second transmission range, and the two transmission ranges do not overlap, and the first band-pass filter filters out measurement light of the distance measurement device.

10. The coordinate measurement apparatus according to claim 1 or 2, comprising:
a pointer light source for producing light in the visible region; and
an incoupling for coupling in said light as a beam into the common beam path of the distance measurement device and of the fine target detection unit.

11. The coordinate measurement apparatus according to claim 1, comprising:
an overview camera sensitive at least in the visible range, for the coarse localisation of the measurement aid by way of light in the visible region.

12. The coordinate measurement apparatus according to claim 1 or 2, wherein:
the first light source is an infrared light source for radiating an infrared target beam, the infrared target beam, with a reflection on the measurement aid, being visible as an infrared target point; and
the fine target detection unit is adapted for determining the fine position as the position of the image of the infrared target point on the first position detection sensor.

13. The coordinate measurement apparatus according to claim 1 or 2, wherein:
the carrier is rotatable about a tilt axis running at least approximately horizontally in operation of the coordinate measurement apparatus, and about a pivot axis running at least approximately vertically; and
the measurement axis does not intersect the tilt axis and/or the measurement axis does not intersect the pivot axis.

14. The coordinate measurement apparatus according to claim 13, wherein:
the measurement axis and the tilt axis are distanced to one another by a distance of at least one half or at least one millimeter.

15. The coordinate measurement apparatus according to claim 13, wherein:
the light beam of the distance measurement device is coupled into the beam path of the fine target detection unit by way of a semitransparent mirror; and
an axis of the beam path of the fine target detection unit is displaced parallel by way of this semitransparent mirror.

16. The coordinate measurement apparatus, according to claim 1, wherein the distance measurement device comprises:
a measurement light source for producing a measurement light beam;
a beam splitter which couples out a part of the produced measurement light beam; and
a beam expander which expands the coupled-out measurement light and by way of this leads it onto two separate detectors.

17. The coordinate measurement system according to claim 16, wherein the beam expander comprises:
a cylinder prism or a row of cylinder prisms which lie next to one another and are formed of one piece.

18. A method for operating a coordinate measurement apparatus, wherein the coordinate measurement apparatus includes:
a carrier which, with respect to a base, is rotatable about at least two axes,
wherein:
at least in each case, one exit optical system and/or entry optical system of the following units are arranged on the carrier in a commonly movable manner:
at least one optical distance measurement device;
a first light source;
a fine target detection unit, wherein the fine target detection unit and the distance measurement device have a common exit optical system;
a second light source;
a coarse target detection unit, wherein the coarse target detection unit is only sensitive to light in the infrared region;
the method comprising:
measuring the distance to a measurement aid moveable in space, by way of the optical distance measurement device;
radiating a first target beam by way of the first light source and optical elements, wherein the first target beam, reflected at the measurement aid, is visible as a first target point;
determining a fine position as the position of the image of the first target point on a first position detection sensor of the fine target detection unit;
radiating light at least in the infrared region by way of the second light source, wherein this light, reflected at the measurement aid, is visible as a second target point on a second position detection sensor of the coarse target detection unit;

determining a coarse position as the position of the image of the second target point on the second position detection sensor of the coarse target detection unit; and automatically aligning the carrier onto the measurement aid by way of rotating about the at least two axes of the carrier by way of the closed-loop control device, in accordance with the fine position and the coarse position, wherein the carrier is aligned onto the measurement aid on account of the coarse position until the fine target detection unit detects the target beam.

19. The method according to claim 18, wherein:

the first light source is an infrared light source;

the first target beam is an infrared target beam radiated by way of the infrared light source and the optical elements, wherein the infrared target beam, reflected at the measurement aid, is visible as an infrared target point; and the fine position as the position of the image of the infrared target point is determined on the first position detection sensor.

20. The coordinate measurement apparatus according to claim 1 or 2, wherein:

the optical distance measurement device is an absolute distance measurement apparatus or an interferometer, or a combination of both.

21. The coordinate measurement apparatus according to claim 2, wherein:

the overview camera is built for the coarse localisation of the measurement aid by way of light in the visible region.

\* \* \* \* \*